United States Patent [19]
Miller

[11] Patent Number: 6,107,759
[45] Date of Patent: Aug. 22, 2000

[54] MULTI-FUNCTION ACTUATION APPARATUS

[75] Inventor: Robin Mihekum Miller, Ellington, Conn.

[73] Assignee: Lear Automotive Dearborn, Inc., Southfield, Mich.

[21] Appl. No.: 09/265,104

[22] Filed: Mar. 9, 1999

[51] Int. Cl.[7] .............................. E05F 15/10; B60S 1/04; B60R 25/00
[52] U.S. Cl. .................................. 318/4; 318/14; 318/15
[58] Field of Search .................. 318/4, 9–12, 14–15, 318/281–282, 445, 446, DIG. 2

[56] References Cited

U.S. PATENT DOCUMENTS

| | | | |
|---|---|---|---|
| 4,427,929 | 1/1984 | Andrei-Alexandru et al. | 318/282 |
| 4,450,390 | 5/1984 | Andrei-Alexandru et al. | 318/282 |
| 4,478,004 | 10/1984 | Andrei-Alexandru et al. | 49/72 |
| 4,949,563 | 8/1990 | Gerard et al. | 70/279 |
| 5,519,258 | 5/1996 | Stroven et al. | 307/10 |
| 5,682,090 | 10/1997 | Shigematsu et al. | 318/468 |
| 5,694,812 | 12/1997 | Maue et al. | 74/471 R |
| 5,764,010 | 6/1998 | Maue et al. | 318/443 |
| 5,844,382 | 12/1998 | Dan | 318/10 |
| 5,847,519 | 12/1998 | Kilker | 318/4 |
| 5,920,158 | 7/1999 | Miller et al. | 318/4 |
| 5,949,206 | 9/1999 | Oruganty et al. | 318/280 |

*Primary Examiner*—Bentsu Ro
*Attorney, Agent, or Firm*—MacMillan, Sobanski & Todd, LLC

[57] ABSTRACT

A multi-function actuation apparatus includes an electromagnetic device and a rotatable member which rotates in response to activation of the electromagnetic device. The rotatable member provides a first actuation force to actuate a first function and activation of the electromagnetic device provides a second actuation force operable to actuate a second function. The multi-functional apparatus is preferably for use in a vehicle, such that the present invention provides the motive force to activate a plurality of powered vehicle functions including a first function such as a power window or window wiper while further actuating additional functions.

16 Claims, 8 Drawing Sheets

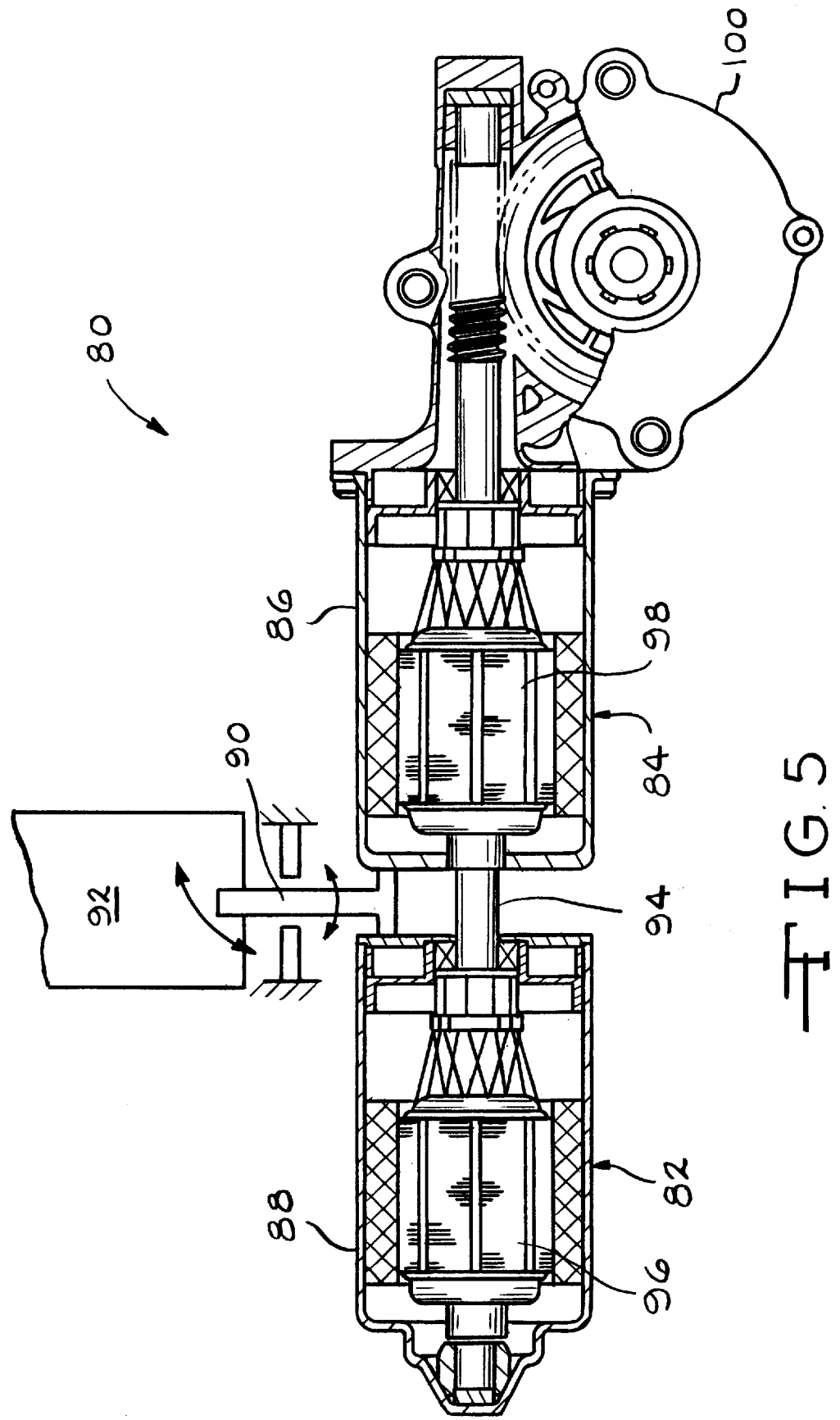

MULTI-FUNCTION ACTUATION APPARATUS

BACKGROUND OF THE INVENTION

The present invention relates to a motion transmitting apparatus which provides the motive force to activate a first and second vehicle function.

It is common to employ an electric motor to raise and lower the window of a vehicle or actuate a window wiper. Typically, these power mechanisms include a reversible, fractional horsepower, direct current electric motor to actuate a gear assembly through an armature shaft-mounted gear and gear system. The window mechanism is usually mounted within a driver or passenger side door to actuate the window. Similarly, the rear window wiper arrangement is usually mounted upon a pivoting liftgate of a minivan, station wagon, sport-utility vehicle or the like to actuate the wiper.

It is also common to employ an independent powered door lock or latch mechanism, typically actuated by a solenoid, which allows the driver or passenger side door to be locked or unlocked. Similarly, a separate liftgate lock is often mounted within the pivoting liftgate. These powered locks are also commonly operated by a separate electric motor or solenoid.

Typically separate motor or solenoid actuation systems are commonly required to actuate the various locks, power windows or rear wiper mechanisms individually. The traditional need for such a multiplicity of electromagnetic devices has increased the automotive vehicle weight and cost while further proving difficult to package within the often small spaces provided. This added weight is especially detrimental when the window mechanism, window lock, and their distinct respective electromagnetic devices, are all incorporated within a vehicle door or liftgate. Not only is the cost increased due to this multiplicity of these devices, but the individual assembly cost, electric wiring, and failure modes are increased.

SUMMARY OF THE INVENTION

Disclosed embodiments of the present invention provide a multi-function actuation apparatus including an electromagnetic device and a rotatable member which rotates in response to activation of the electromagnetic device. The rotatable member provides a first actuation force to actuate a first function and motion from the activation of the electromagnetic device provides a second actuation force operable to actuate a second function.

The multi-functional apparatus is preferably for use in a vehicle, such that the electromagnetic device and the rotatable member mounting provides the motive force to activate a plurality of powered vehicle functions. The multi-functional apparatus provides actuation for a first function such as a power window, window wiper or the like, and can further actuate a secondary function such as locking and unlocking a door.

A typical window lift mechanism requires approximately 50 in-lb. at 60 rpm for power, and the locking mechanism requires only 1 pound of force at approximately ¾ inch of travel. The present invention discloses various embodiments of a multi-functional apparatuses which accomplish both in a single inexpensive, light weight package.

In one embodiment, the electromagnetic device operates the first function and the housing for the electromagnetic device is movable in response to activation of the electromagnetic device. The movable housing can therefore be used to provide the second actuation force to actuate the second function.

In another embodiment, the present invention provides a gear system and an interlocking device between a first and a second intermeshed gear. The interlock can independently lock either the first or second gear such that the first gear provides the first actuation force to actuate the first function when the second gear is locked, and a second gear provides the second actuation force to actuate the second function when the first gear is locked.

In yet another embodiment, the electromagnetic device includes a first electric motor and a second electric motor. Simultaneous or individual activation of the first and second motors providing the first actuation force to actuate the first function, and differential activation of the first and second motors provide the second actuation force or second and third actuation force to actuate the second function or second and third function.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is yet another alternate embodiment of a multi functional apparatus according to the present invention;

DETAILED DESCRIPTION OF THE PREFERRED EMBODIMENT

Figure 1A:
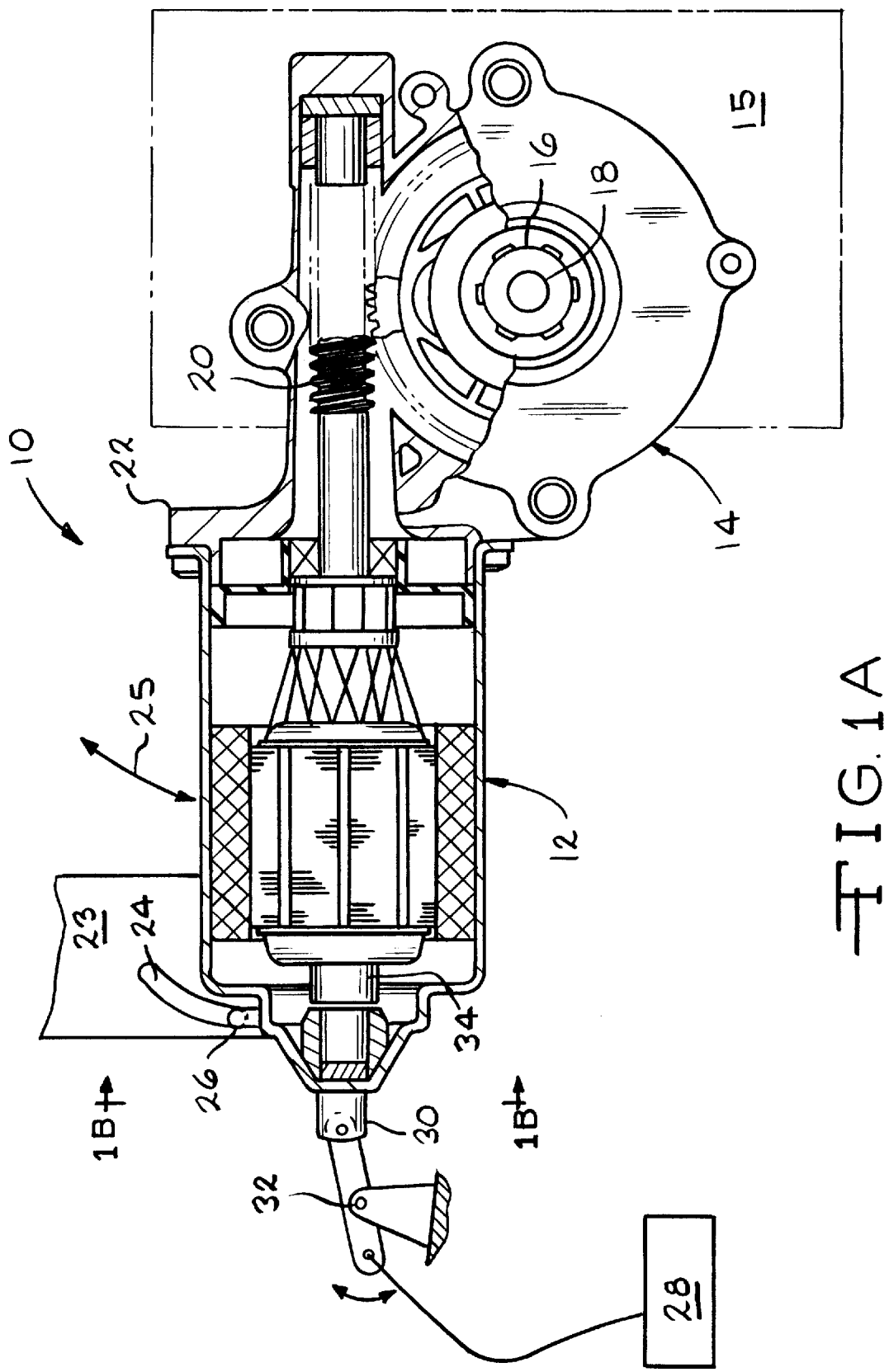
FIG. 1A is an embodiment of a multi-functional actuation apparatus according to the present invention.

FIG. 1A provides a detailed perspective view of an electromagnetic device 12 and a rotatable member 14 which can provide the output for a wiper or powered window, (geartrain shown schematically at 15). The rotatable member preferably includes an output pinion 16 mounted on an axle 18. The output pinion 16 will typically be driven by a worm gear shaft 20 within a housing 22 attached to the electromagnetic device 12. Although, a relatively simple gear system is shown, one skilled in the art will realize that various gear configurations can be provided to operate a desired function and to operate a secondary function in accordance with the present invention.

Figure 1B:
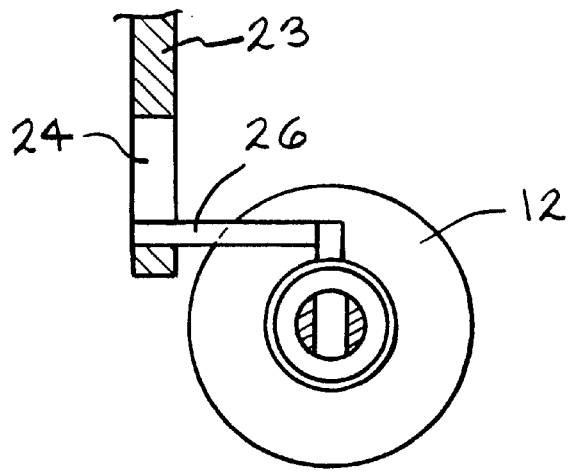
FIG. 1B is a side view of the multi-functional actuation apparatus of FIG. 1A taken along line 1B-1B.

The electromagnetic device 12 and housing 22 are mounted within a vehicle door or the like, in such a way that the apparatus 10 can rotate around the axle 18 of the output pinion 16. The electromagnetic device 12 is typically a reversible, fractional horsepower, direct current electric motor commonly known in the art and readily used for various vehicle functions. Preferably, an arcuate slot 24 is formed in a fixed mounting plate 23 to provide an attachment point for a slidable mounting pin 26 which restrains the apparatus 10 motion to a few degrees (FIG. 1B). Although limited to a few degrees, the slidable mounting pin 26 and arcuate slot 24 provide the degree of motion necessary to actuate a secondary function such as to lock or unlock a vehicle door.

As can be seen in FIG. 1B, the pin 26 is fixed to the end cap of the electromagnetic device 12 and is received in slot 24 to guide the motion of the electromagnetic device 12. A spring (not shown), may also bias the device to the non actuated position of FIG. 1A.

When it is desired by an operator to actuate the secondary function of, for example, a powered lock system 28 (shown schematically), the direction of the electromagnetic device 12 is momentarily reversed. This activation can either be achieved by a rapid impulse of the electromagnetic device 12, or by a slower impulse coupled with a non-back drive device such as a one-way clutch (not shown). The momentary reversal creates a torque (shown along arrow 25) that causes the apparatus 10 to rotate around the axle 18 of the output pinion 16 to articulate a switch 30. The switch 30 can be activated by contacting a fixed mounting surface 32 or other switch system. Thus, when electromagnetic device 12 pivots switch 30 hits switch surface 32 and activates the lock.

The locking system 28 can be operated in many know ways such as by an electromagnetic actuator or bimetallic strip (heating of two different expansion factor materials) which allows operation of the powered lock system 28. Preferably, for maximum safety, the locking of the vehicle door would involve the same motor direction as closing the window, such that both operations could happen simultaneously. What is inventive is not the detail of how the lock/unlock is achieved. Rather, what is novel is how the function is activated.

Figure 1C:
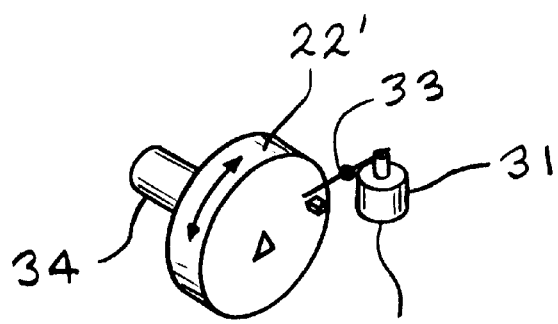
FIG. 1C is an alternate embodiment of the multi functional apparatus of FIG. 1A illustrating a rotationally activated switch.

One skilled in the art will realize that this small degree of rotational motion can be provided at various locations of the apparatus. For example, as shown in the end view of FIG. 1C, rotation of the housing of the electromagnetic device 12 about its motor drive axis could also be used. Whereas the electromagnetic device 12 is mounted along an axial shaft 34, the output for the secondary function can be similarly activated by this rotation of the housing 22'. The rotation of the housing 22' can thus be used to actuate a switch 31 with a housing 22' mounted linkage 33. The switch 31 can further be a button type switch which alternately activates and deactivates a function.

Figure 1D:
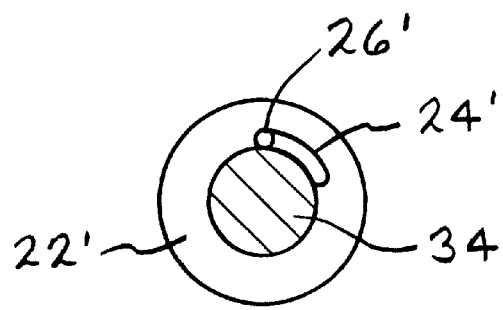
FIG. 1D is another alternate embodiment of the multi functional apparatus of FIG. 1A illustrating a rotationally limiting activated switch.

As shown in FIG. 1D, the rotation can be limited to a few degrees by a mounting pin 26' and an arcuate slot 24' within the housing 22'. Although limited to a few degrees, the pin 26' and arcuate slot 24' provide the degree of rotational motion necessary to again actuate a secondary function such as to lock or unlock a vehicle door.

Figure 2:
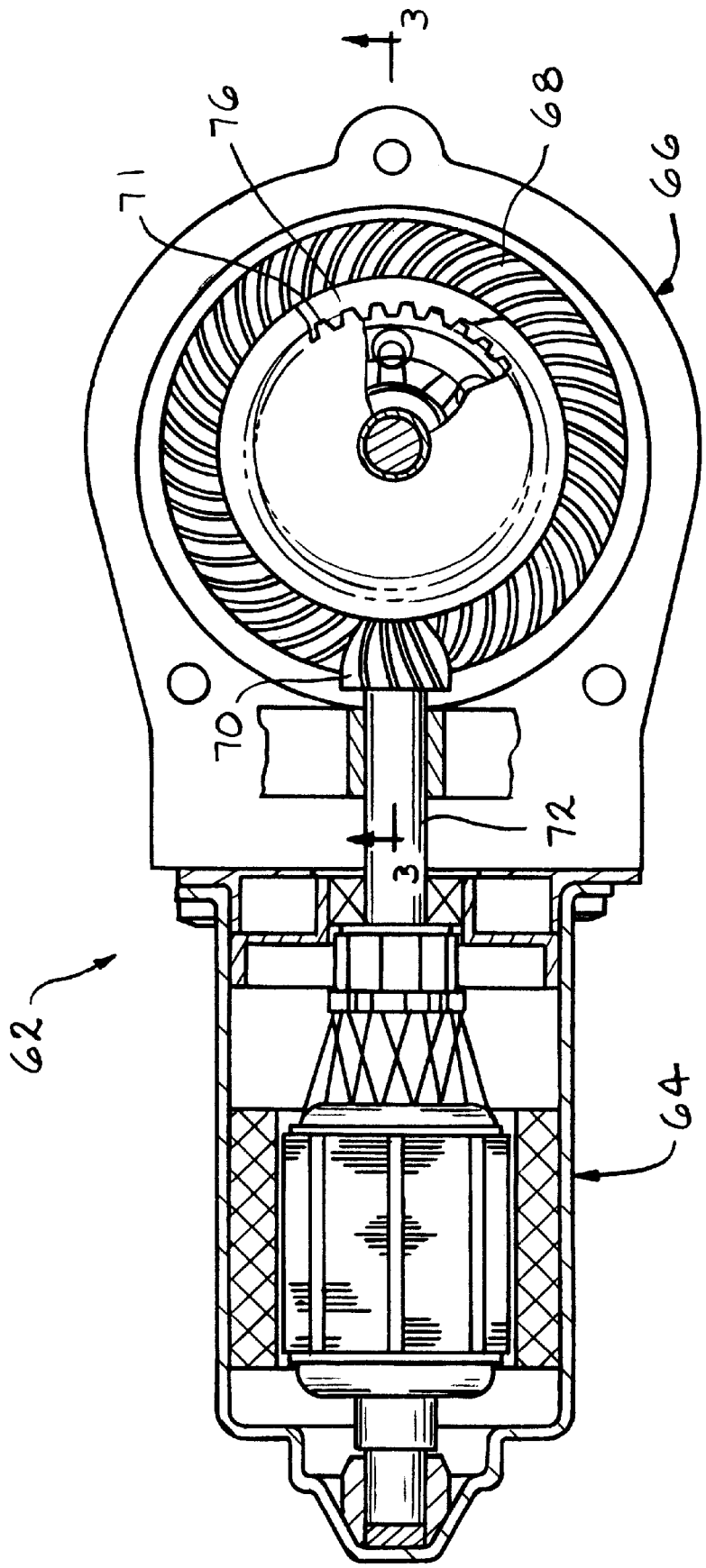
FIG. 2 is another alternate embodiment of a multi functional apparatus according to the present invention.

Another alternate embodiment of a multi-function actuation apparatus 62 is shown in FIG. 2 which similarly includes an electromagnetic device 64 and a gear system 66. The gear system 66 preferably includes an input gear 68 which rotates in response to activation of the a drive pinion 70 attached to the electromagnetic device 64 through a shaft 72. The gear system 66 further includes a first 74 and second 76 intermeshed gear which rotate in response to the input gear 68. Although a harmonic gear system is illustrated, one skilled in the art will realize that a planetary gear system in which the first 74 and second 76 intermeshed gears are preferably at least one planet gear and a solar gear can be similarly configured in accordance with the present invention.

Figure 3:
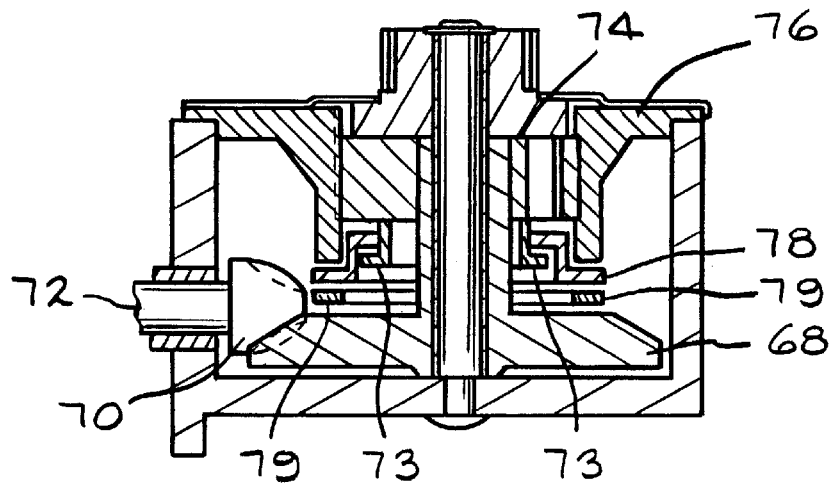
FIG. 3 is a cross-sectional view of the multi functional apparatus shown in FIG. 2 taken along the line 3—3.

As illustrated in the sectional view of FIG. 3, taken along the line 3—3 of FIG. 2, a locking device 78 is further provided to independently lock and unlock the first 74 and second 76 intermeshed gear which allows two output functions to be performed by the single gear system 66. Preferably, the first gear 74 provides a first actuation force to actuate a first function when the locking device 78 locks the second gear 76 and the second gear 76 provides a second actuation force to actuate a second function when the locking device 78 locks the first gear 74.

The locking device 78 is preferably a brake plate (FIG. 4A) between the first 74 and second gear 76 that is activated by an electromagnetic 79 to lock either gear 74,76. To lock the first gear 74 the locking device 78 is urged downward (as illustrated in the sectional view of FIG. 3) toward an extended portion 73 of the first gear 74 such that the first gear 74 stops independently rotating. Accordingly, as the first gear 74 is fixed relative the input gear 68, the second gear 76 becomes the primary output gear. Similarly, to lock the second gear 74 the locking device 78 is urged upward toward the second gear 76 such that the second gear 76 does not independently rotate. Accordingly, as the second gear 76 is fixed, the first gear 74 becomes the primary output gear. One output would thus be high torque (to actuate a lock), and the other would be low torque (to actuate a window).

Figure 4A:
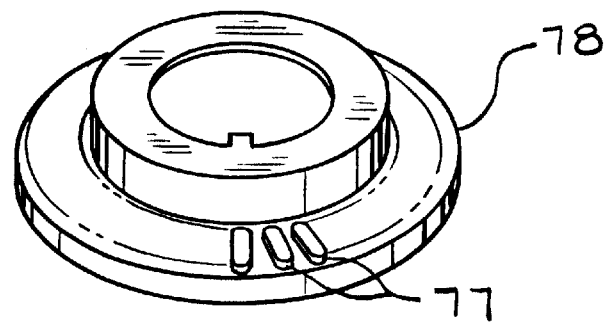
FIG. 4A is an expanded perspective view of the locking device illustrated in FIG. 2.
Figure 4B:
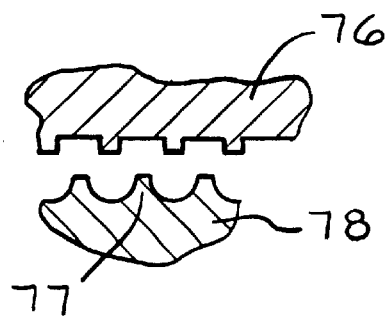
FIG. 4B is an expanded perspective view of the interaction of the locking device and a gear as illustrated in FIG. 3.

FIG. 4A further details an exemplary embodiment of the interlocking device 78 described above. The device 78 is preferably a plate having teeth 77 engageable with the teeth of the first gear 74 and second 76 gear. Although teeth 77 are only shown on one face, it should be understood that similar teeth are formed on an opposed face of the plate. Although teeth 77 are shown in FIG. 4B, one skilled in the art will realize that other engagement devices are usable and the present invention should not be limited to only a brake plate having gear teeth.

Yet another alternate embodiment of a multi-function actuation apparatus 80 is shown in FIG. 5 which similarly includes a first 82 and a second 84 electromagnetic device. The second electromagnetic device 84 is preferably mounted coaxially with the first electromagnetic device 82, such that the first 82 and second 84 electromagnetic devices provide a first actuation force to actuate a first function. Each electromagnetic device will typically be one-half the size and provide one-half the torque necessary as the single motor systems described above. The double motor system can therefore operate the first function such as a powered window while providing additional mounting possibilities. As the second electromagnetic device 84 is mounted coaxially with the first electromagnetic device 82, the motor housings 86,88 can be mounted independently and are allowed to rotate relative to each other around the shaft centerline. The operation when the two motors 82,84 oppose each other thus allows for a small amount of rotational movement of one motor with respect to the other motor (reaction torque between the rotor and stator) which is used for the secondary function, such as a door lock.

As will be further described below, a switch member 90 is mounted between the housings 86,88 to activate the secondary function (shown schematically at 92) when there is relative motion between the motors 82,84. Due to both motors having a common motor shaft 94 connecting the two stators 96,98, each drive the output 100 to the first function in common when driven in the same direction. Preferably, for the smoothest action of the first function, both motors are actuated together.

When the first function is being operated, such as moving a power window up, the second function can still be activated. For example only, while both motors 82,84 are being driven in a first direction, a command to activate the second function causes the first motor 82 to be driven backwards by a predetermined impulse of power. The impulse creates a differential motion between the housings 86,88 to move the switch 90, and actuate the secondary function 92.

When the first function is being operated in the opposite manner, such as moving a power window down, the above is reversed. While both motors 82,84 are being driven in a second direction, a command to activate the second function causes the second motor 84 to be driven backwards by a predetermined impulse of power. The impulse creates a differential motion between the housings 86,88 to move the switch 90 in an opposite direction, and actuate the secondary function. Similarly, to activate the third function, the opposite motor is activated and a differential motion is created in the opposite direction.

When the first function is not being operated, the first motor 82 is pulsed in the opposite direction of the second motor 84 to allow for switch 90 movement without activating the output 100 to the first function.

Figure 6:
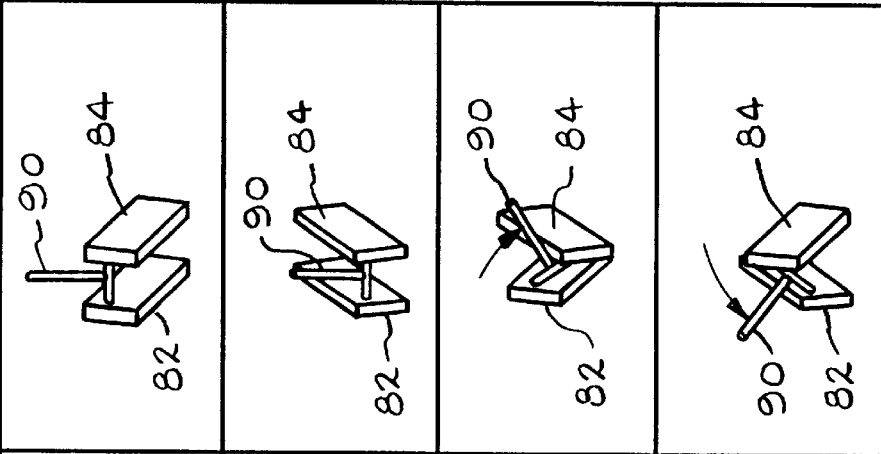
FIG. 6 is a schematic illustration of motor logic which provides activation of the first and second function of the multi functional apparatus shown in FIG. 6.

FIG. 6 schematically illustrates the motor logic which can provide independent activation of the first and second function of the multi functional apparatus shown in FIG. 5. For example only, a powered window is representative of the first function and a vehicle door lock is representative of the second function. The window can therefore be driven up and down by activating both motors 82 and 84 in the same direction. As the motors are operated in the same direction, there is no differential motion and the switch 90 does not activate the lock.

To activate the secondary function (vehicle lock) the motors 82 and 84 are operated differentially. Thus, when the window is being driven up (case A), and the lock is to be activated (case C), the second motor 84 is pulsed in the opposite direction of the first motor 82 to allow for switch 90 movement and lock activation. When the window is being driven up (case A) up, and an unlocking action is desired (case D), the first motor 82 is pulsed in the opposite direction of the second motor 84 to allow for the opposite switch 90 movement. Operation is reversed when the window is being driven down (case B), and momentary differential activation of the motors 82,84 can provide for switch 90 movement without activation of the first function.

If the window is being raised or lowered during the action of locking or unlocking, one motor will continue to move the window at full speed. As described above, the other motor is momentarily activated in the reverse direction at a much lower torque value for a short duration, then switched back to the same direction to support the other motor again in the window action. Since peak torque is usually only necessary to accelerate the window or break through 'sticktion', there should not be a problem with single-motor movement for the short interval necessary to actuate a lock or the like. The incremental motion stops must sustain against a full speed stop.

Additionally, double output can be achieved by having a friction fit between the two motors 82,84 such that activation of one then the other will not activate the switch 90 but will be increased or decreased in increments. Then if one motor is driven backwards, the spacing of the switch expands for one activation, and if the other motion is driven backwards, then the spacing of the switch contracts for the second activation. This provides a potentiometer type switch that can activate various vehicle functions.

Figure 7:
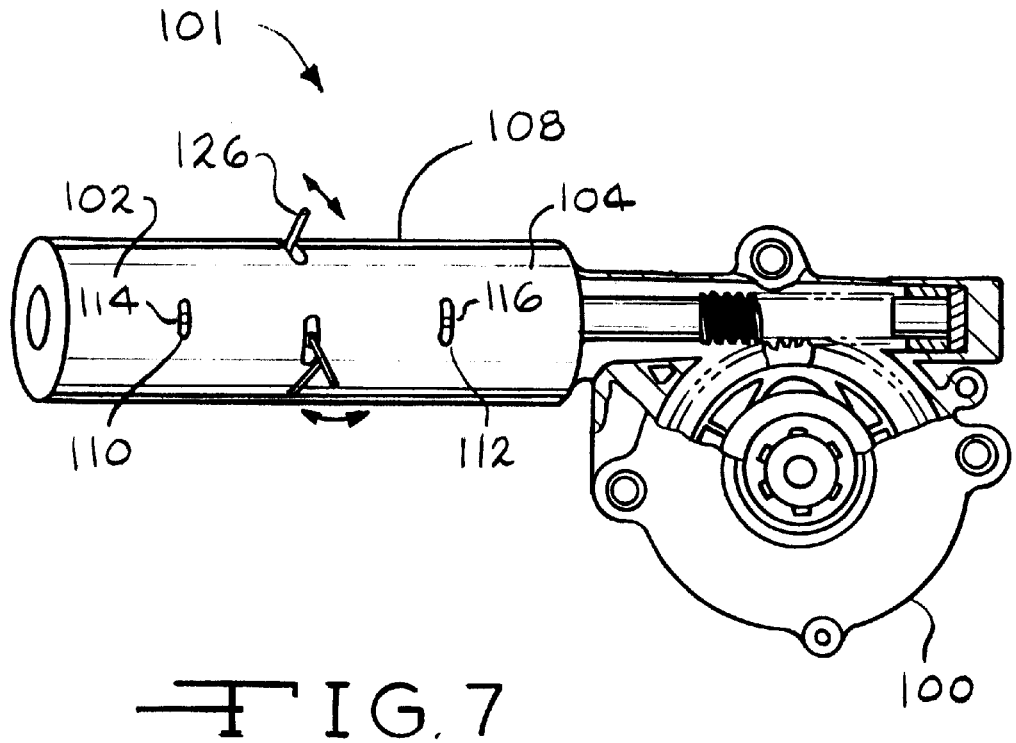
FIG. 7 is yet another alternate embodiment of a multi functional apparatus according to the present invention.

Yet another alternate embodiment of a multi-function actuation apparatus 101 is somewhat schematically illustrated in FIG. 7. The multi-function actuation apparatus 101 of FIG. 7 is further adapted to operate three functions, such as windshield wiper, lock/unlock, and window operation.

Figure 9:
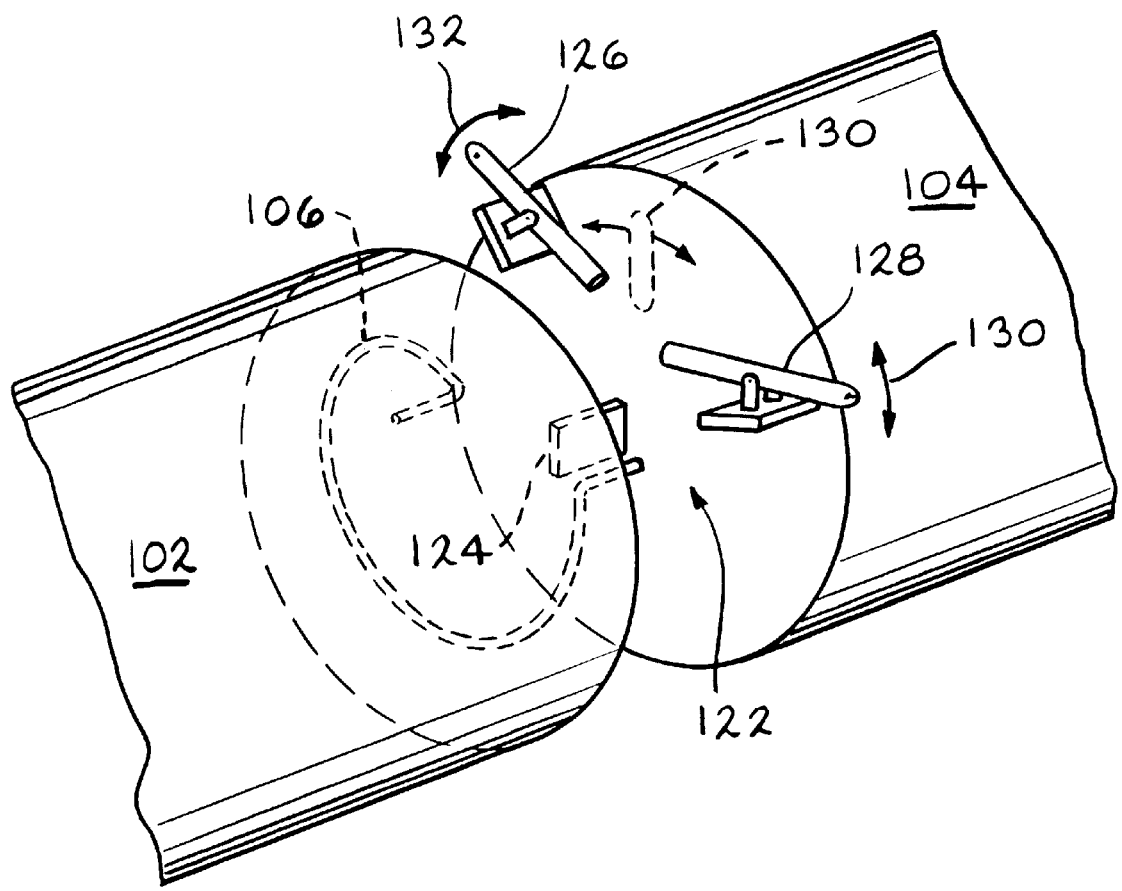
FIG. 9 is an exploded view between the electromagnetic devices of FIG. 7, separated to show the switch activation arrangement of a multi functional apparatus according to the present invention.

As best seen in FIG. 9, the multi-function apparatus 101 again includes a first 102 and a second 104 coaxially mounted electromagnetic device attached through a spring 106 which restricts differential motion. An output 100 is similarily activated as described above by the co-axially mounted motors 102, 104. A housing 108 contains the first 102 and second 104 electromagnetic device rotatable within said housing and includes a first slot 110 and a second slot 112 to receive a first 114 and a second 116 limit pin. The limit pins 114,116 are attached to the first and second motors 102,104 and fit respectively within the first and second slots 110,112. The pins 114,116 and slots 110,112 operate to restrict the rotational motion of the motors 102, 104 contained within housing 108.

Figure 8:
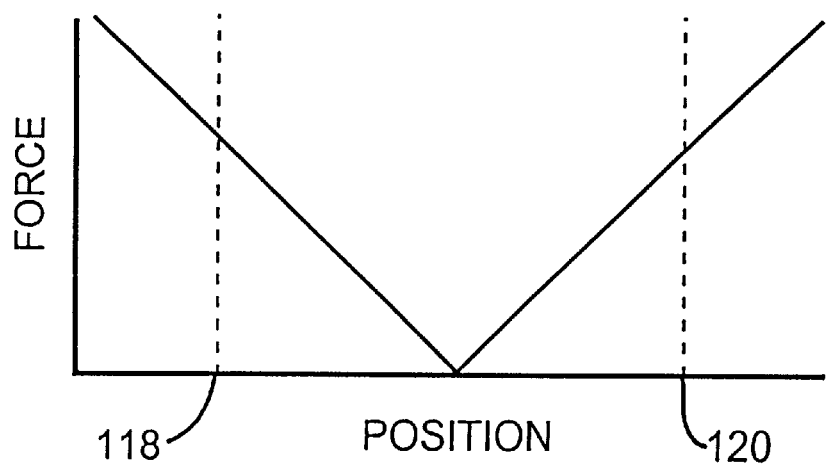
FIG. 8 is a graphical illustration of centering spring force and position curve which allows activation of first, second and tertiary functions of the multi functional apparatus shown in FIG. 7.

The spring 106 restricts differential motion unless the first 102 and second 104 motors are specifically driven in opposite directions to overcome the spring 106. As shown in FIG. 8, the spring 106 creates a centering force which must be overcome prior actuation of a vehicle function at the predetermined actuation points 118,120. By differentially activating the first 102 and second 104 motors, the spring 106 will be overcome and the actuation points 118, or 120 will be surpassed. This differential rotational movement (limited by pins 114,116 movement within slots 110,112) is then used to operate a vehicle function or the like as described below.

FIG. 9 is an exploded view between the first 102 and second 104 electromagnetic devices of FIG. 7 separated to show a switch arrangement 122 which can be used to operate various vehicle functions. The switch arrangement 122 is preferably located between the first 102 and second 104 electromagnetic devices such that the differential motion described above provides a mechanical activation force while providing a compact installation. An actuation member 124 is attached to the first motor 102 and is located between a first 126 and second 128 lever switch. The actuation member 124 is shown in phantom at 130 to depict its location when the motors 102,104 are coaxially mounted within the housing 108 (not shown).

Upon a differential activation of the first 102 and second 104 motors, the spring 106 will be overcome and the respective actuation point 118, or 120 (FIG. 8) will be surpassed. The actuation member 124 will then operate a lever switch 126 or 128 such that a mechanical activation (illustrated schematically by arrows 130,132) is provided. In other words, the actuation member 124 contacts one end of the lever switch such that the other end of the lever can operate a secondary vehicle function. Similarly, differential motion in the opposite direction causes the actuation member 124 to contact the other lever switch to operate a tertiary vehicle function.

The lever switches 126,128 are preferred as they can provide a mechanical advantage to activate a mechanical system, however, a push button electrical switch could be equally applicable for use with the present invention. As one skill in the art will realize, the actuation member and switches can be placed in other locations to similarly take advantage of the differential motion of coaxial mounted electromagnetic devices.

The foregoing description is to be exemplary rather than defined by the limitations within. Obviously, many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the present invention may be practiced otherwise than as specifically described. For that reason the following claims should be studied to determine the true scope and content of this invention.

What is claimed is:

1. A multi-function actuation apparatus comprising:
   an electromagnetic device including a housing; and
   a rotatable member which rotates in response to activation of said electromagnetic device, said rotatable member providing a first actuation force to actuate a first function,
   wherein selective activation of said electromagnetic device providing a second actuation force operable to actuate a second function, and
   wherein said housing is movable in response to selective actuation of said electromagnetic device to provide said second actuation force to actuate said second function.

2. The apparatus according to claim 1, wherein said electromagnetic device includes a first electric motor and a second electric motor, simultaneous activation of said first and second motors providing said first actuation force to actuate said first function, and differential activation of said first and second motors providing said second actuation force to actuate said second function.

3. The apparatus according to claim 1, wherein said first function is a window wiper.

4. The apparatus according to claim 1, wherein said first function is a power window.

5. The apparatus according to claim 1, wherein said second function is a vehicle door lock.

6. The apparatus according to claim 1, wherein said second function is a window release.

7. A multi-function actuation apparatus comprising:
   an electromagnetic device; and
   a rotatable member which rotates in response to activation of said electromagnetic device, said rotatable member providing a first actuation force to actuate a first function,
   wherein selective activation of said electromagnetic device providing a second actuation force operable to actuate a second function, and
   wherein said rotatable member includes a gear system having an input sun gear, at least one planet gear, and a solar gear, said at least one planet gear and said solar gear independently lockable in response to selective activation of said electromagnetic device to provided output from said at least one planet gear or said solar gear, said at least one planet gear providing said first actuation force to actuate said first function, and said solar gear providing said second actuation force to actuate said second function.

8. A multi-function actuation apparatus comprising:
   an electromagnetic device; and
   a rotatable member which rotates in response to activation of said electromagnetic device, said rotatable member providing a first actuation force to actuate a first function,
   wherein selective activation of said electromagnetic device providing a second actuation force operable to actuate a second function, and
   wherein said electromagnetic device includes a first electric motor and a second electric motor, simultaneous activation of said first and second motors providing said first actuation force to actuate said first function, clockwise activation of said first motor and counter-clockwise activation of said second motor provides said second actuation force to actuate said second function, counter-clockwise activation of said first motor and clockwise activation of said second motor provides a third actuation force to actuate a tertiary function.

9. A multi-function actuation apparatus comprising:
   an electromagnetic device;
   an input gear which rotates in response to activation of said electromagnetic device;
   a gear system which rotates in response to said input gear, said gear system including a first and second intermeshed gear;
   a locking device to independently lock said first gear and said second gear, such that said first gear provides a first actuation force to actuate a first function when said locking device locks said second gear and said second gear provides a second actuation force to actuate a second function when said locking device locks said first gear.

10. The apparatus according to claim 9, wherein said locking device is a brake plate between said first gear and said second gear.

11. A multi-function actuation apparatus comprising:
    a first electromagnetic device;
    a second electromagnetic device mounted coaxially with said first electromagnetic device, said first and second electromagnetic devices providing a first actuation force to actuate a first function; and
    a switch member attached to said first electromagnetic device and said second electromagnetic device, said switch member providing a second actuation force to actuate a second function.

12. The apparatus according to claim 11, wherein rotation of said first and second electromagnetic devices in a same direction provides said first actuation force to actuate said first function, and rotation of said first and second electromagnetic devices in an opposite direction provides said second actuation force to actuate said second function.

13. The apparatus according to claim 11, wherein rotation of said first and second electromagnetic devices in a same direction provides said first actuation force to actuate said first function, and a first differential rotation of said first and second electromagnetic devices moves said switch member to a first position to provide said second actuation force to actuate said second function, and a second differential rotation of said first and second electromagnetic devices moves said switch member to a second position to provide a tertiary actuation force to actuate a tertiary function, while a first opposite differential rotation of said first and second electromagnetic devices returns said switch member to said first position and a second opposite differential rotation of said first and second electromagnetic devices returns said switch member to an original position.

14. The apparatus according to claim 11, further comprising a centering spring attached to said first and second electromagnetic devices such that a predetermined differential activation of said first and second electromagnetic devices overcomes said centering spring.

15. The apparatus according to claim 11, wherein said switch member is cyclically operated by a predetermined differential activation of said first and second electromagnetic devices.

16. A multifunction actuation apparatus comprising:

first electromagnetic device;

a second electromagnetic device mounted coaxially with said first electromagnetic device, said first and second electromagnetic devices providing a first actuation force to actuate a first function;

a first switch positioned between said first and second electromagnetic devices, said first switch providing a second actuation force to actuate a second function;

a second switch positioned between said first and second electromagnetic devices, said second switch providing a tertiary actuation force to actuate a tertiary function; and a centering spring attached to said first and second electromagnetic devices such that said centering spring returns said first switch, and said second switch to an original position upon cessation of selective activation of said first and second electromagnetic devices.

* * * * *